W. C. HARRISON.
RAKE.
APPLICATION FILED FEB. 6, 1917.

1,232,539. Patented July 10, 1917.

Inventor
W. C. Harrison
By Edson Bros
Attorneys

Witness

UNITED STATES PATENT OFFICE.

WILLIE C. HARRISON, OF ARROWSMITH, ILLINOIS.

RAKE.

1,232,539.   Specification of Letters Patent.   Patented July 10, 1917.

Application filed February 6, 1917. Serial No. 146,943.

*To all whom it may concern:*

Be it known that I, WILLIE C. HARRISON, a citizen of the United States, residing at Arrowsmith, in the county of McLean and State of Illinois, have invented certain new and useful Improvements in Rakes; and I do hereby declare the following to be a full, clear, and exact description of the invention, such as will enable others skilled in the art to which it appertains to make and use the same.

This invention is a rake of that type generally known as a corn rake, having for its object to simplify the construction and render the device more durable.

The invention comprises a socket member and head bar, the latter being provided with a plurality of teeth of novel construction, which are mounted in spaced relation by webs, the head bar having a centrally disposed rib to strengthen the same on a line where the teeth will exert the greatest strain on the head bar. The head bar is provided also with truss members extending from the socket to the outer portions of the bar.

Further objects and advantages of the invention will become apparent from the following detail description thereof taken in connection with the accompanying drawings and appended claims.

While the preferred embodiment of the invention is disclosed in the accompanying drawings, it is to be understood that the construction therein shown is for the purposes of illustration only and not as defining the limits of the invention.

In the drawings:—

Figure is a perspective view of the rake showing a portion of a handle inserted in the socket member.

Figure 1:
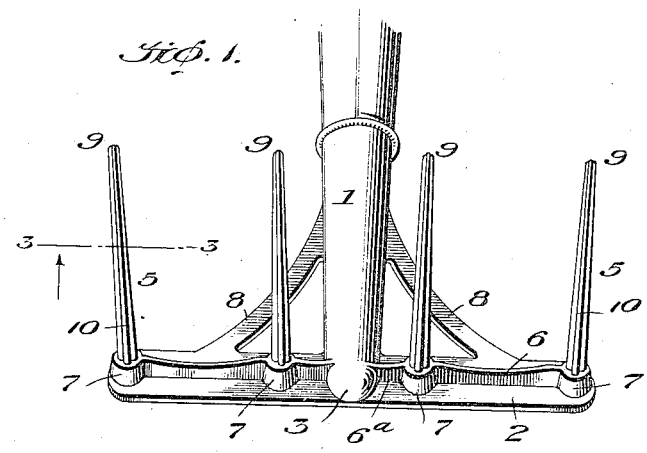

The rake may be of any desired material and design. In the drawings, however, the socket member 1 is shown tubular in form and tapering from the open end of the socket toward the head bar 2, which is shown positioned at right angles to the length of the socket. The end of the socket member 1, adjacent the head bar 2 may be closed if desired, leaving such end in a substantially semispherical form.

The head bar may be a flattened wide piece of metal strengthened by a centrally positioned rib 4, which is shown merging into the material of the socket at the end 3 thereof. This rib may be tapering in form from the base of the plate 2 to its outer edge, and serves to strengthen the head bar 2 on a line where the greatest strain would be exerted thereon by the rake teeth, which would be indicated at 5.

Figure 2:
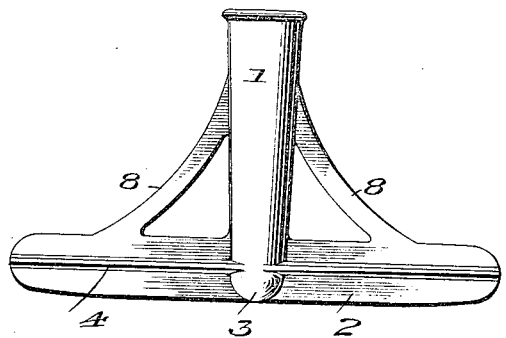
Fig. 2 is a top plan view of the socket and head bar.

The rake teeth are positioned on the opposite side of the head bar 2 to that on which the rib 4 is placed, and these rake teeth will preferably be spaced at a predetermined distance apart by suitable spacing webs 6, which webs are shown arcuate in form and connecting collar members 7, serving as the foundation structure for each of the teeth 5. The collar member 7 may be integral with the head plate 2, if desired, and in like manner the spacing web 6 and the rib 4 may be formed integral with said head bar 2. Central web 6ª is shown extending from the two central collars 7 to the end 3 of the socket member, where they merge into the material of the socket member, similar to the merging of the rib 4 into the material of the socket member, as shown in Fig. 2.

The head bar is found provided with truss members 8, which are shown as extending on each side of the head plate 2 to the socket member 1. These truss members may be curved, and are preferably positioned to extend from a point substantially midway of the length of the socket member to points substantially midway between the socket member and the outer ends of the head bar 2.

Figure 3:
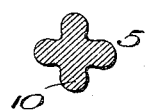
Fig. 3 is an enlarged cross-sectional view through one of the rake teeth.

The teeth 5 are preferably ribbed longitudinally, the teeth and ribs being tapered from the base of the teeth, which is secured to the collars 7, toward the outer ends 9 of the teeth, the ribs of the teeth being indicated at 10 in Figs. 1 and 3. The teeth positioned near the outer ends of the head bar 2 are preferably deflected slightly outwardly and away from the parallel plane of the inner teeth, as will be understood from an inspection of Fig. 1 of the drawings.

It is obvious that various changes in the design or form or proportion of parts may be made without departing from the spirit of the invention, and the right is reserved to make such changes as fairly fall within the scope of the appended claims.

Having thus described the invention, what is claimed as new is:—

1. A rake comprising a socket member, a head bar secured thereto and provided with a plurality of teeth, and spacing webs interposed between the teeth and positioned longitudinally of the bar on one side thereof.

2. A rake comprising a socket member, a head bar secured thereto, and provided with a plurality of teeth, curved spacing webs separating the teeth and positioned longitudinally of the head bar on one side thereof, and a rib positioned on the other side of the bar to coöperate with the spacing webs in strengthening the head bar.

3. A rake comprising a socket member, a head bar secured thereto and provided with a plurality of teeth, the teeth positioned near the outer ends of the head bar being directed slightly outwardly, curved spacing webs serving as truss members arranged longitudinally of the head bar and between the teeth, and a rib extending from the outer ends of the head bar to, and merging into, an end of the socket member.

In testimony whereof, I affix my signature.

WILLIE C. HARRISON.

Copies of this patent may be obtained for five cents each, by addressing the "Commissioner of Patents, Washington, D. C."